(12) United States Patent
Finck

(10) Patent No.: US 12,231,017 B2
(45) Date of Patent: Feb. 18, 2025

(54) ELECTRIC MOTOR WITH AIR-GAP SLEEVE

(71) Applicant: Siemens Aktiengesellschaft, Munich (DE)

(72) Inventor: David Finck, Forchheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/908,718

(22) PCT Filed: Jan. 25, 2021

(86) PCT No.: PCT/EP2021/051623
§ 371 (c)(1),
(2) Date: Sep. 1, 2022

(87) PCT Pub. No.: WO2021/175511
PCT Pub. Date: Sep. 10, 2021

(65) Prior Publication Data
US 2023/0163657 A1    May 25, 2023

(30) Foreign Application Priority Data
Mar. 4, 2020 (DE) ...................... 10 2020 202 781.1

(51) Int. Cl.
*H02K 5/12* (2006.01)
*H02K 5/128* (2006.01)
(Continued)

(52) U.S. Cl.
CPC ............... *H02K 5/128* (2013.01); *H02K 9/10* (2013.01); *H02K 9/197* (2013.01); *H02K 11/20* (2016.01); *H02K 11/30* (2016.01)

(58) Field of Classification Search
CPC .......... H02K 5/128; H02K 9/10; H02K 9/197; H02K 11/20; H02K 11/30
(Continued)

(56) References Cited

U.S. PATENT DOCUMENTS 3,089,969 A   5/1963  Wiedmann ...................... 310/53
6,863,504 B2  3/2005  Kimberlin ..................... 417/301
(Continued)

FOREIGN PATENT DOCUMENTS

DE   1022676 B   1/1958   ............. H02K 9/197
DE   41 38 268   5/1993   .............. H02K 9/19
(Continued)

OTHER PUBLICATIONS

Search Report for International Application No. PCT/EP2021/051623, 13 pages, May 3, 2021.
(Continued)

*Primary Examiner* — Rashad H Johnson
(74) *Attorney, Agent, or Firm* — Slayden Grubert Beard PLLC

(57) ABSTRACT

Various embodiments of the teachings herein include an electric motor. The electric motor may include: a rotor; a stator; an air-gap sleeve; and a cooling liquid on an inner side of the stator. The air-gap sleeve seals a rotor inner region against the cooling liquid. The air-gap sleeve produces an overpressure of greater than 1 bar in a region of the rotor defined by the air-gap sleeve.

13 Claims, 1 Drawing Sheet

(51) Int. Cl.
  *H02K 9/10*    (2006.01)
  *H02K 9/197*   (2006.01)
  *H02K 11/20*   (2016.01)
  *H02K 11/30*   (2016.01)

(58) Field of Classification Search
  USPC ........................................................ 310/86
  See application file for complete search history.

(56) References Cited

U.S. PATENT DOCUMENTS

| | | | | |
|---|---|---|---|---|
| 7,057,318 B2* | 6/2006 | Strobl | .................... | H02K 29/08 |
| | | | | 310/90 |
| 2008/0024034 A1 | 1/2008 | Koizumi | ................... | 310/266 |
| 2008/0253907 A1* | 10/2008 | Lind | .................... | F04D 29/05 |
| | | | | 277/306 |
| 2008/0309174 A1* | 12/2008 | Jockel | .................. | H02K 9/225 |
| | | | | 310/54 |
| 2010/0028176 A1* | 2/2010 | Platt | .................... | F04D 13/027 |
| | | | | 415/10 |
| 2011/0008184 A1 | 1/2011 | De Boer | .................... | 417/228 |
| 2011/0012448 A1 | 1/2011 | Tanaka | ..................... | 310/54 |
| 2011/0058966 A1 | 3/2011 | Cunningham | .............. | 417/410.1 |
| 2013/0293042 A1* | 11/2013 | Ribarov | ................. | H02K 9/08 |
| | | | | 310/59 |
| 2014/0217841 A1* | 8/2014 | Riegels | ................. | H02K 5/203 |
| | | | | 310/54 |
| 2015/0093256 A1 | 4/2015 | Mariotti | .................. | F04D 25/06 |
| 2016/0211721 A1 | 7/2016 | Garmon et al. | .................. | 310/54 |
| 2016/0380517 A1* | 12/2016 | Yonemori | ................. | H02K 9/223 |
| | | | | 310/53 |
| 2017/0294821 A1 | 10/2017 | Shimizu | .................... | H02K 5/20 |
| 2018/0048213 A1* | 2/2018 | Rubin | ........................ | H02K 1/06 |
| 2018/0278120 A1* | 9/2018 | Hanquez | ................. | B60K 6/26 |
| 2019/0267885 A1* | 8/2019 | Frank | ........................ | H02K 9/20 |
| 2020/0028402 A1* | 1/2020 | Looser | ................... | F16C 37/002 |
| 2021/0003132 A1 | 1/2021 | Imai | ........................ | F04D 13/06 |
| 2023/0081243 A1* | 3/2023 | Li | ............................ | H02K 1/28 |
| | | | | 310/156.28 |
| 2023/0155454 A1* | 5/2023 | McClelland | ............. | H02K 3/24 |
| | | | | 310/54 |
| 2023/0163657 A1* | 5/2023 | Finck | ....................... | H02K 9/10 |
| | | | | 310/86 |
| 2023/0358242 A1* | 11/2023 | Raju | ................... | F04D 13/0633 |
| 2023/0387768 A1* | 11/2023 | Hauber | .................. | H02K 15/02 |

FOREIGN PATENT DOCUMENTS

| | | | |
|---|---|---|---|
| DE | 10 2017 102 987 | 8/2018 | ............. H02K 11/40 |
| GB | 743 778 | 1/1956 | |
| JP | 2012 213272 | 11/2001 | ............. H02K 3/487 |
| JP | 2009213231 A | 9/2009 | ............. H02K 5/20 |
| WO | 2011 099603 | 8/2011 | ............. H02K 5/128 |
| WO | 2019 172196 | 9/2019 | ............. F04D 13/06 |

OTHER PUBLICATIONS

Search Report for DE Application No. 10 2020 202 781.1, 5 pages, Jun. 18, 2020.
Japanese Office Action, Application No. 2022552403, 9 pages, Jan. 23, 2024.
European Office Action, Application No. 21704419.7, 8 pages, Jun. 21, 2024.

* cited by examiner

ELECTRIC MOTOR WITH AIR-GAP SLEEVE

CROSS-REFERENCE TO RELATED APPLICATIONS

This application is a U.S. National Stage Application of International Application No. PCT/EP2021/051623 filed Jan. 25, 2021, which designates the United States of America, and claims priority to DE Application No. 10 2020 202 781.1 filed Mar. 4, 2020, the contents of which are hereby incorporated by reference in their entirety.

TECHNICAL FIELD

The present disclosure relates to electric motors. Various embodiments include electric motors with an air gap sleeve.

BACKGROUND

The increase in the power density of electric motors is gaining ever more importance in the field of electrified mobility, such as in electrically driven motor vehicles such as buses, passenger cars, commercial vehicles, trains and ships and also aircraft for example, because weight can be saved owing to more powerful motors. Therefore, increased focus is being placed on liquid-cooled electric motors.

The waste heat produced and the associated problems have a dimension-determining effect on the electrical power density of an electric motor. One problem is, for example, the failure of the polymeric insulation of the winding coils in the laminated cores of the stator of any electric motor. Therefore, the maximum temperature in the stator winding is also typically a particularly critical point when developing higher power densities in the electric motor.

The trend for liquid cooling is based on the higher waste heat flow which can be achieved by liquid cooling in comparison to gas-air cooling. In this case, the stator, together with the laminated cores and the winding coils present in polymeric potting compound, but not the rotor, is generally cooled. Owing to the lack of polymeric insulation, the rotor is less sensitive to heat than the laminated cores of the stator, which have a polymeric potting compound. Liquid cooling of an electric motor is generally preferably implemented on the outer side of the stator because the interface to the rotor otherwise has to be leaktight on the inner side of the stator.

Channels for liquid cooling are therefore generally located on the outer side of the stator. One problem here is that the liquid-cooled cooling rings are situated on the outer side of the laminated core and therefore said laminated core first has to be completely traversed in the radial direction by the heat flow. Therefore, electric motors with liquid cooling on the inner and the outer side of the stator have been available for some time. These electric motors contain what is known as an air-gap sleeve.

The air-gap sleeve separates the cooling liquid in the stator region from the rotating rotor. The cooling liquid would otherwise severely hinder the rotation of the rotor. The typical objective in the development of the air-gap sleeve is to implement as low a wall thickness as possible since the electrical losses of the electric motor can be reduced in this way.

Various boundary conditions have to be observed when developing components of air-gap sleeves. The task of the air-gap sleeve is to separate the liquid cooling from the rotor since otherwise high frictional losses would brake the electric motor. The use of an air-gap sleeve makes sense only if the electrical losses are canceled out by increased performance which is possible owing to the improved cooling in the stator region. The air-gap sleeve is located between the rotor and the stator and should therefore be as thin as possible.

Alternating magnetic fields, as occur in the air gap of an electric motor of extreme size, induce an eddy current in electrically conductive materials. The eddy current in turn generates a magnetic field which is directed opposite to its originator magnetic field. In addition, an induced eddy current leads to rapid heating of the component. It is therefore undesirable in many respects for an air-gap sleeve to consist of an electrically conductive material. Therefore, reinforced composite materials, including ceramic and/or glass-ceramic composite materials, are used for this purpose.

An air-gap sleeve has to have a certain minimum thickness because the load, in particular the dimensioning load, which is crucial to the thickness of the air-gap sleeve, is an external pressure which is caused by the accelerations which the cooling medium causes during mobile use of the electric motor, such as occurs in motor vehicles, trains, aircraft, ships for example. Excessively thin air-gap sleeves collapse under the above-described pressure, wherein the mechanical phenomenon of buckling can be identified at a preliminary stage. The air-gap sleeves which are already aged due to loading are therefore identifiable due to radial buckling.

Motors with an air-gap sleeve are described, for example, from DE 10 2010 011 316. Said document proposes an air-gap sleeve which can be of thin design because it is radially supported with supporting wedges, which are fastened in the slots of the laminated core of the stator, for use in hermetically sealed pumps. The technology described in said document of central slot wedge support for an air-gap sleeve was investigated by simulation—see FIG. 1—but it was found in so doing that this technology has the disadvantage that the coefficients of expansion of the air-gap sleeves and of the laminated core of the stator are considerably different and therefore produce extreme stresses on the air-gap sleeve during operation, these causing material loading there.

SUMMARY

The teachings of the present disclosure describe an electric motor with an air-gap sleeve with liquid cooling of the stator, in which the air-gap sleeve is designed to be as thin as possible. For example, some embodiments of the teachings herein include an electric motor with an air-gap sleeve, with liquid cooling on the inner side of the stator and sealing of a rotor inner region from the cooling liquid by the air-gap sleeve, wherein an overpressure, that is to say a pressure of greater than 1 bar, is provided in the region of the rotor that is defined by the air-gap sleeve.

In some embodiments, the gas in the rotor inner region is air.

In some embodiments, the gas in the rotor inner region is an inert gas.

In some embodiments, a pump is provided, it being possible for an elevated gas pressure to be generated in the rotor inner region by said pump.

In some embodiments, liquid cooling is provided on the inner and the outer side of the stator.

In some embodiments, first sensors are provided, it being possible for the pressure within the rotor inner region to be measured by said first sensors.

In some embodiments, second sensors are provided, it being possible for the pressure within the stator region through which coolant flows to be measured by said second sensors.

In some embodiments, lines are provided, said lines connecting the first and/or the second sensors to an open-loop and closed-loop control device.

In some embodiments, at least one valve for pressure regulation is provided in the rotor inner region.

In some embodiments, the, at least one, valve is provided in the end plate and/or housing of the electric motor.

In some embodiments, the open-loop and closed-loop control device is arranged on the end plate or on the housing of the electric motor.

In some embodiments, a pump for generating an overpressure is provided in the rotor inner region.

In some embodiments, the pump is provided on the end plate.

DETAILED DESCRIPTION

Figure 1:
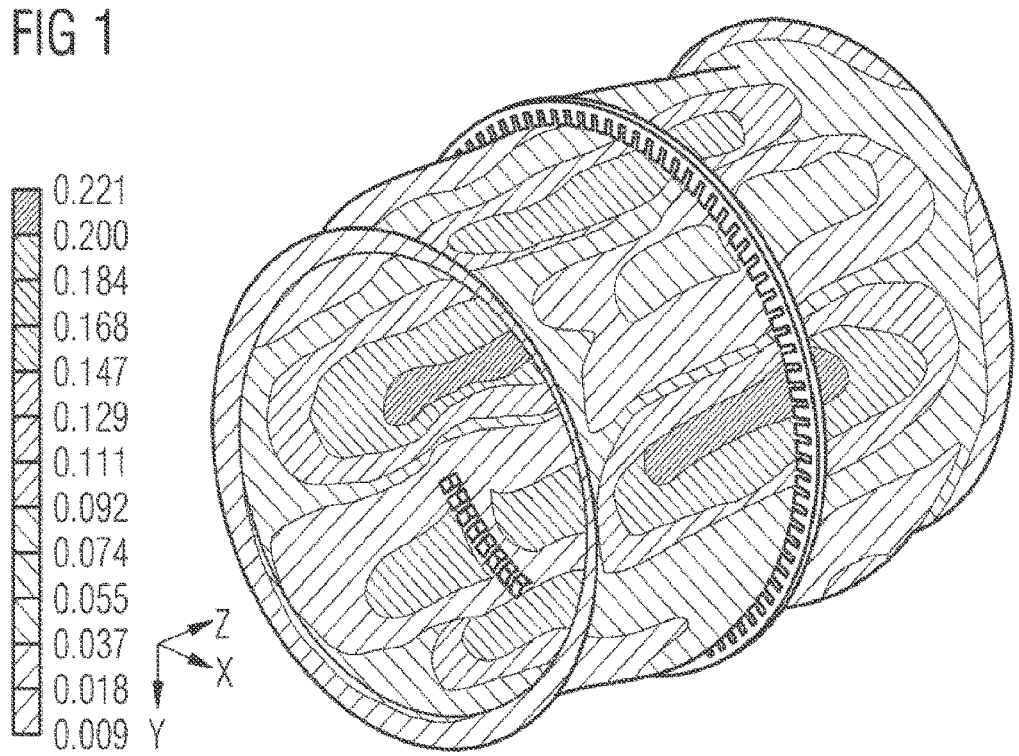
FIG. 1 shows the results of a simulation of an air-gap sleeve of thin design radially supported with supporting wedges, which are fastened in the slots of the laminated core of the stator, for use in hermetically sealed pumps.

The subject matter of the present disclosure is therefore an electric motor with an air-gap sleeve, with liquid cooling on the inner side of the stator and sealing of an inner region of the rotor by the air-gap sleeve, wherein an overpressure, that is to say a pressure of greater than 1 bar, is provided in the region of the rotor that is defined by the air-gap sleeve. In general, an air-gap sleeve which is of extremely thin design can be stabilized from the inside by application of pressure, so that it withstands the external pressure due to the liquid cooling of the stator, that is to say the load which is produced by the movement of the liquid of the stator cooling arrangement during mobile application, better than under standard conditions, that is to say below an internal pressure of 1 bar.

In the case of electric motors which exhibit liquid cooling of the inner side of the stator, the air-gap sleeve defines a rotor inner region which is closed off in a leak-tight manner from the stator region through which coolant flows. In the case of these electric motors, the rotor inner region is sealed off in any case, and therefore an overpressure can be maintained structurally even without additional means for sealing the air-gap sleeve in the rotor inner region.

In these electric motors, an overpressure in the rotor inner region can even serve to seal undesired leaks in the air-gap sleeve, due to which liquid could undesirably enter the rotor inner region without overpressure, owing to the overpressure, so that the overpressure in the rotor inner region corrects the leaks. Such leaks can occur temporarily in an electric motor with an air-gap sleeve owing to the difference in the coefficients of thermal expansion. At the same time, the increase in the internal pressure in the rotor inner region is accompanied by a reduction in efficiency, but this can be compensated for by means of the increase in efficiency owing to the small wall thickness of the air-gap sleeve.

In some embodiments, the air-gap sleeve with a small wall thickness is stabilized with an internal pressure against the acting external pressure of the coolant of the stator region. The entire portion situated behind the air-gap sleeve is, as the rotor inner region of the electric motor, under elevated gas pressure. The build-up of pressure can be linked to the operation of the electric motor, but a constant overpressure can also be provided in the rotor inner region of the electric motor. In this case, the gas pressure may be selected to be so high that the maximum external pressure load case leaves the air-gap sleeve free of stress.

Increments in the desired internal pressure in the rotor region are provided, these being adapted depending on the application and not being able to be defined absolutely here. The gas pressure is generally selected to be so high that a high, frequently occurring external pressure load case leaves the air-gap sleeve free of stress. The gas pressure in the inner region of the rotor is particularly preferably selected such that the maximum external pressure load case is compensated in the balance of forces.

In order to set a suitable internal pressure, the air-gap sleeve thickness and the internal pressure are defined such that firstly buckling of the air-gap sleeve outward under low loading by the coolant liquid, with uniform or no movement of the motor, for example, due to the internal pressure, is avoided, but secondly, in the event of movement of the motor, a sufficient internal pressure prevails which—comparably for example to drinks cans containing carbonated beverages such as Coca Cola—prevents the air-gap sleeve from buckling inward into the region of the stator.

In some embodiments, the gas in the rotor inner region is air.

In some embodiments, the gas in the rotor inner region is some other gas or gas mixture, for example an inert gas, for example nitrogen. In this case, the inert gas is a gas with a high thermal capacity or other physical properties which promote the removal of heat from the rotor.

In some embodiments, there are first sensors measuring the pressure within the rotor inner region. In some embodiments, second sensors measure the pressure within the liquid cooling arrangement of the stator. The cooling liquid for liquid cooling of the stator is located within the stator housing, the end side of which is closed off by an end plate which, for its part, is matched to the stator housing with an accurate fit and which guides the drive shaft leading out of the rotor.

In some embodiments, one or more valves is/are provided—for example in the end plate and/or housing of the electric motor. Said valves may serve to regulate the pressure in the rotor inner region.

In some embodiments, the first and/or the second sensors to be connected to a closed-loop and open-loop control device. In this case, provision is particularly made for the valves, which generate and/or maintain the internal pressure in the rotor inner region, to be controlled by the open-loop and closed-loop control device.

The closed-loop and open-loop control device can be provided at different locations on the electric motor. For example, the closed-loop and open-loop control device is located on the end plate or on the housing of the electric motor.

In some embodiments, an air pump is provided, it being possible for said air pump to be operated by means of the closed-loop and open-loop control electronics. In some embodiments, the air pump may be mounted on the outer side of the end plate.

In some embodiments, lines are provided, which guide air into the rotor inner region via the pump.

In some embodiments, the internal pressure in the rotor inner region may be set by the closed-loop and open-loop control device. Owing to active open-loop control of the internal pressure of the rotor inner region, depending on the rotor and/or stator temperature of the electric motor, the different coefficients of thermal expansion of laminated cores on the one hand and the air-gap sleeve on the other are actively corrected by respectively adapting the internal pressure of the rotor inner region.

For example, as soon as the rotor threatens to collide with the air-gap sleeve due to thermal expansion, the internal pressure on the air-gap sleeve, which defines and delimits the rotor inner region, is increased, and therefore said air-gap sleeve widens. Conversely, as soon as the stator threatens to collide with the air-gap sleeve due to thermal expansion, the internal pressure on the air-gap sleeve is reduced, and therefore said air-gap sleeve contracts.

Figure 2:
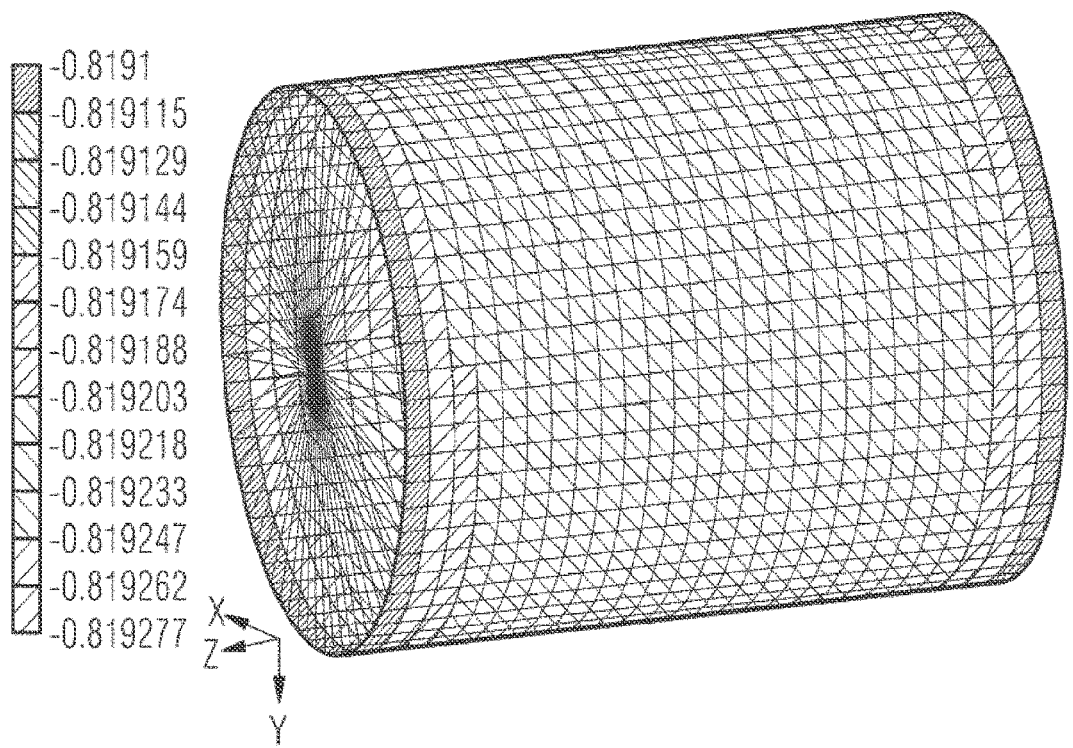
FIG. 2 shows the results of a simulation of an air-gap sleeve with a wall thickness of 0.5 mm to 0.7 mm and a rotor internal pressure of 4.5 to 5 bar.

FIG. 2 shows the result of a simulation of an air-gap sleeve incorporating teachings of the present disclosure during operation. Said figure shows that, for example at internal pressure in the rotor inner region of greater than 3 bar, sufficient stability against outward buckling or other—in particular mechanical—damage to the air-gap sleeve can be established with a small wall thickness of less than 1 mm.

In some embodiments, electric motors of any size with an air-gap sleeve can be operated with an internal pressure in the rotor inner region. In particular, exemplary embodiments with wall thicknesses of the air-gap sleeve of less than 3 mm, in particular less than 2 mm, less than 1 mm, and/or less than 0.7 mm, have already been tested with a very high degree of success, see FIG. 2. In this case, internal pressures of the rotor inner region of 3 bar, greater than 4 bar and even greater than 5 bar were implemented and tested.

FIG. 2 shows an exemplary embodiment of a simulation of an air-gap sleeve with a wall thickness of 0.5 mm to 0.7 mm and a rotor internal pressure of 4.5 to 5 bar. In comparison and with the same loading, substantially thicker air-gap sleeves with wall thicknesses around 2 mm perform substantially more poorly in terms of buckling outward, see FIG. 1.

Some embodiments achieve improved removal of heat from the rotor owing to an overpressure in the rotor inner region of an electric motor with an air-gap sleeve. Owing to the overpressure, the wall thickness of the air-gap sleeve can be reduced by more than 50%, in particular even by more than 70%, the transfer of heat can be increased and a gas with a high thermal capacity can be used.

What is claimed is:

1. An electric motor comprising:
   a rotor;
   a stator;
   an air-gap sleeve; and
   a cooling fluid on an inner side of the stator;
   wherein the air-gap sleeve seals a rotor inner region against the cooling fluid;
   wherein the air-gap sleeve produces a local pressure greater than a pressure exerted by the cooling fluid against the air-gap sleeve by at least 1 bar in a region of the rotor defined by the air-gap sleeve.

2. The electric motor as claimed in claim 1, wherein the cooling fluid comprises air.

3. The electric motor as claimed in claim 1, wherein the cooling fluid comprises an inert gas.

4. The electric motor as claimed in claim 1, further comprising a pump generating an elevated gas pressure in the rotor inner region.

5. The electric motor as claimed in claim 1, further comprising a second cooling fluid surrounding an outer side of the stator.

6. The electric motor as claimed in claim 5, further comprising second sensors measuring a pressure of the second cooling fluid within the stator region.

7. The electric motor as claimed in claim 1, further comprising first sensors measuring a pressure within the rotor inner region.

8. The electric motor as claimed in claim 7, further comprising lines connecting the first sensors to a control device.

9. The electric motor as claimed in claim 8, further comprising a valve for pressure regulation in the rotor inner region.

10. The electric motor as claimed in claim 9, wherein the valve is disposed in an end plate and/or housing of the electric motor.

11. The electric motor as claimed in claim 8, wherein the control device is arranged on an end plate or on a housing of the electric motor.

12. The electric motor as claimed in claim 1, further comprising a pump for generating an overpressure in the rotor inner region.

13. The electric motor as claimed in claim 12, wherein the pump is disposed on an end plate.

* * * * *